June 30, 1970   G. R. ADEY ET AL   3,518,333
METHOD FOR CONTINUOUSLY MAKING PEARLESCENT PLASTIC SHEETING
Filed May 15, 1967   5 Sheets-Sheet 1

INVENTORS.
GEORGE R. ADEY
WILMER SOUDER, JR.
BY Seidel & Gonda
ATTORNEYS.

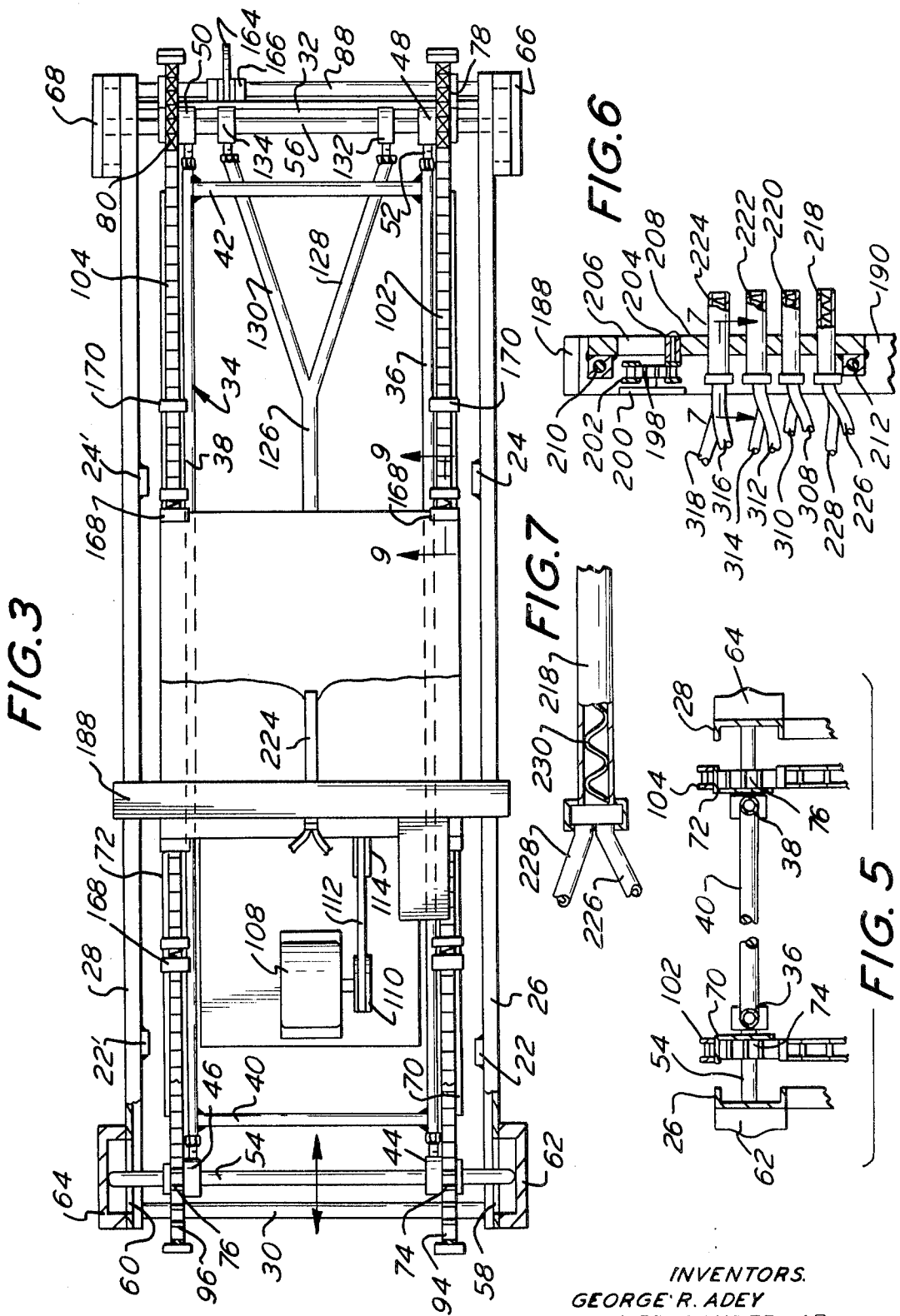

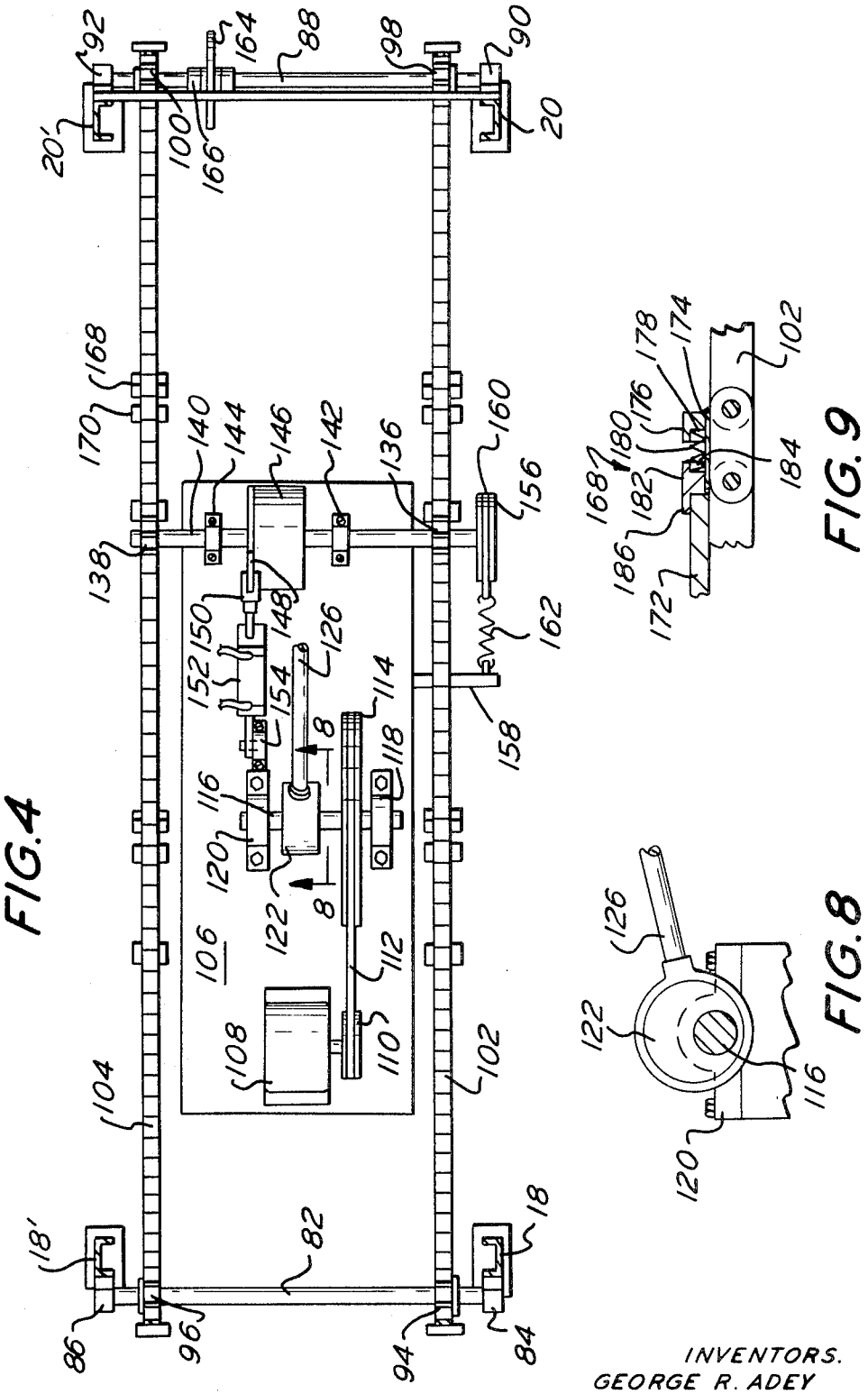

June 30, 1970 G. R. ADEY ET AL 3,518,333
METHOD FOR CONTINUOUSLY MAKING PEARLESCENT PLASTIC SHEETING
Filed May 15, 1967 5 Sheets-Sheet 4
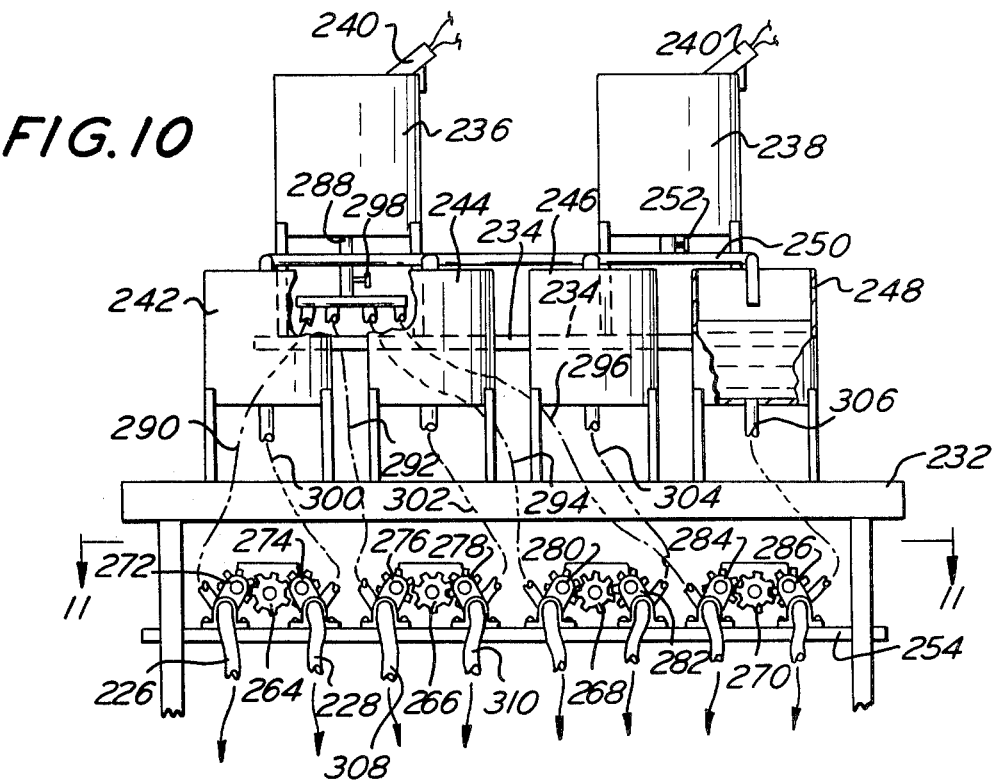
FIG.10
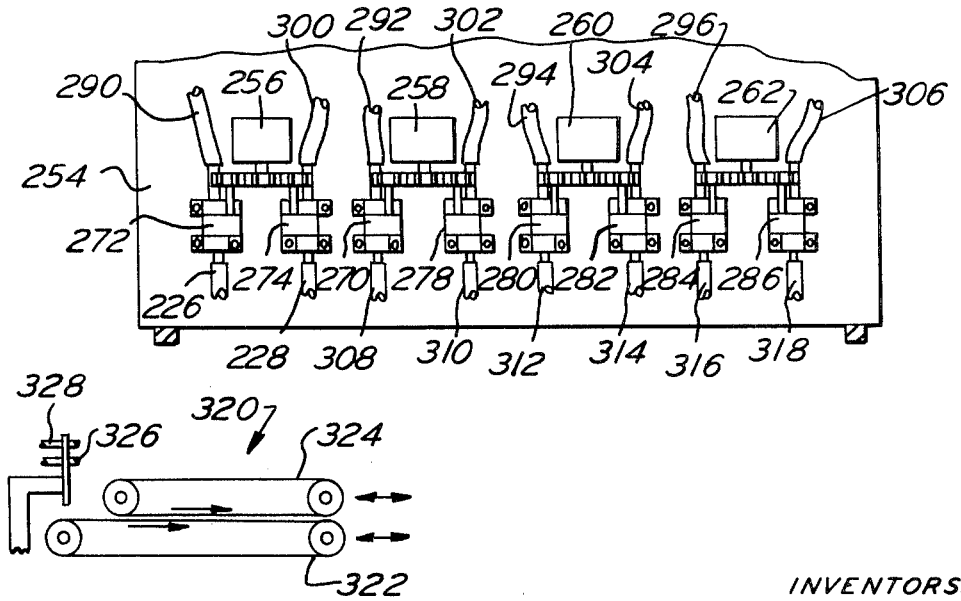
FIG.11
FIG.12
INVENTORS.
GEORGE R. ADEY
WILMER SOUDER, JR
BY
ATTORNEYS.

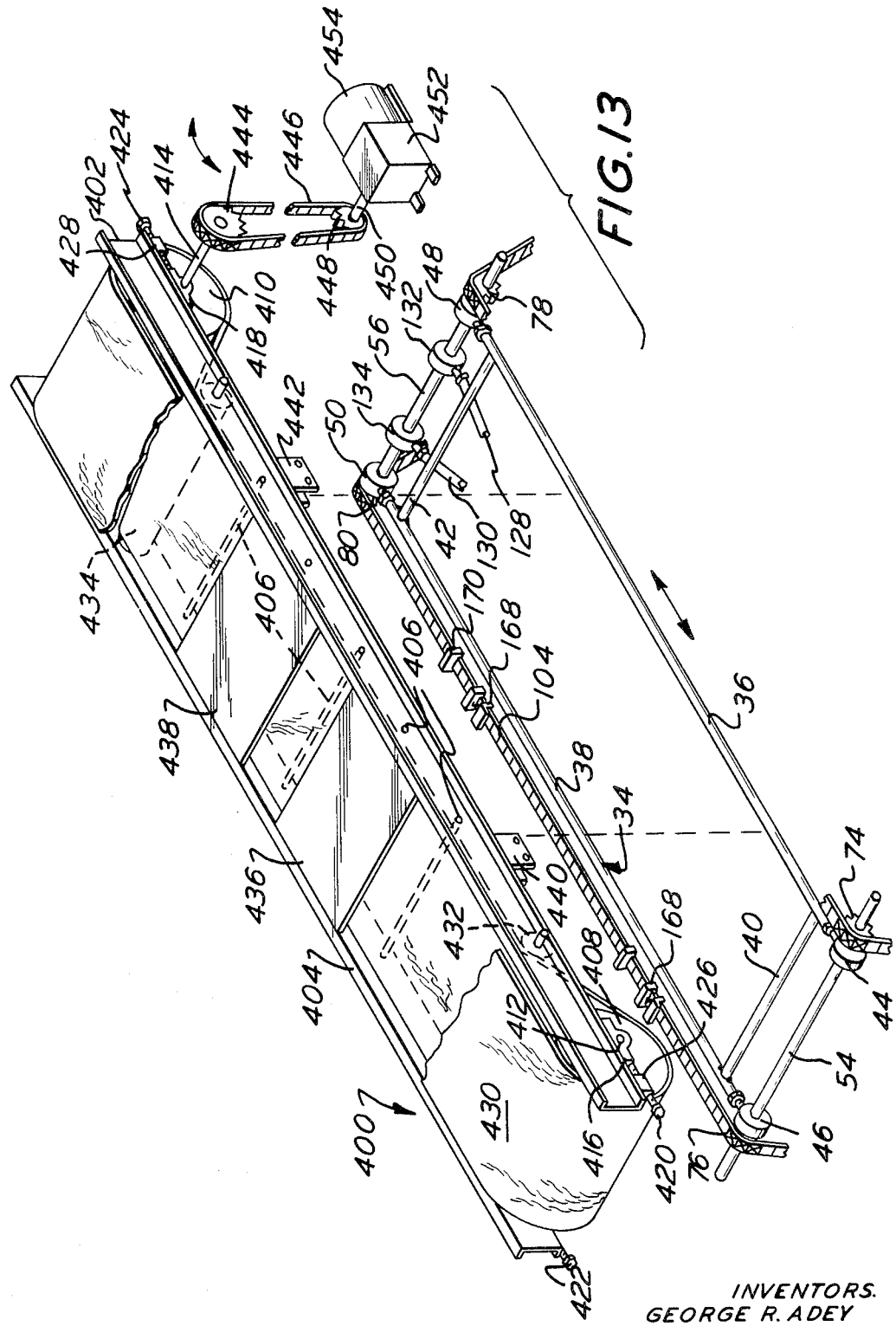

3,518,333
METHOD FOR CONTINUOUSLY MAKING PEARLESCENT PLASTIC SHEETING

George R. Adey, Huntingdon Valley, and Wilmer Souder, Jr., Pottstown, Pa., assignors to Denton Plastic Products Corp. Southampton, Pa., a corporation of Maryland
Filed May 15, 1967, Ser. No. 638,482
Int. Cl. B29b 5/00; B29d 7/02
U.S. Cl. 264—70                                                    1 Claim

ABSTRACT OF THE DISCLOSURE

Method for continuously making pearlescent sheeting including using a reciprocating surface mounted on an endless chain driven by an intermittent drive. Pumps deliver resin material from containers to one or more vertically aligned nozzles being traversed across the surface. Initiation of displacement of the surface is regulated by position of traversing nozzle.

---

This invention relates to a method for continuously making pearlescent plastic sheeting. More particularly, this invention relates to a method for continuously making an oriented pearlescent plastic sheeting having one or more colors.

At the present time plastic articles exhibiting a pearlescent effect or sheen are manufactured in a variety of ways. Pat. 2,856,635, by way of example, discloses a method and apparatus which is capable of manufacturing only a single sheet of plastic material during each operation of the machine. To the same effect are the methods described in Pats. 2,265,266, 2,480,749, and recently, Pat. 3,046,610. Plastic articles produced as described therein, having a pearlescent sheen have many uses, such as for buttons, wall plaques, jewelry and the like.

Such processes are however batch-type methods of manufacturing. The disadvantages of any batch-type operation are manifest. They are inherently slow and inefficient if for no other reason than because they involve machine down time just to remove the completed plastic product. Moreover, there is the additional time factor in preparing the machine for the next batch of plastic resin. Thus, the machine surfaces must be cleaned, a pre-measured batch of resin pigmented with pearlescence must be prepared, and where applicable, time must be allowed for mixing to incorporate a catalyst uniformly into the batch, and then the batch must be applied to the machine.

The present invention overcomes the foregoing disadvantages by incorporating them into a continuous process and providing an apparatus for effecting such a process. For example there are known methods and apparatus for continuously catalyzing many thermosetting resins, however, such methods and apparatus have never been used for the continuous production of plastic sheeting having oriented pearlescence and therefore a pearlescent sheen. Moreover, such methods and apparatus as are known produce undesirable effects in the final product. Thus, it is a general object of the present invention to provide a continuous method for preparing plastic sheeting having oriented pearlescence and thereby articles having a pearlescent sheen.

It is another object of the present invention to provide a method for continuously making pigmented thermoplastic or thermosetting plastic sheeting having an oriented pearlescent sheen.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a top view of the apparatus illustrated in FIG. 1 taken along the line 3—3.

FIG. 4 is a sectional view of the apparatus illustrated in FIG. 1 taken along the line 4—4.

FIG. 5 is a partial transverse sectional view of the apparatus illustrated in FIG. 1 taken along the line 5—5.

FIG. 6 is a partial sectional view of the apparatus illustrated in FIG. 2 taken along the line 6—6.

FIG. 7 is an enlarged partial sectional view of a mixer nozzle.

FIG. 8 is a partial sectional view of a reciprocating drive apparatus taken along the line 8—8 in FIG. 4.

FIG. 9 is a partial sectional view of a clamping means taken along the line 9—9 in FIG. 3.

FIG. 10 is a side view of the mixing and pumping apparatus taken along the line 10—10 in FIG. 2.

FIG. 11 is a partial top view of the apparatus illustrated in FIG. 10 taken along the line 11—11.

FIG. 12 is a schematic illustration of a second embodiment of the present invention.

FIG. 13 is an exploded view of a third embodiment of the present invention.

Figure 1:
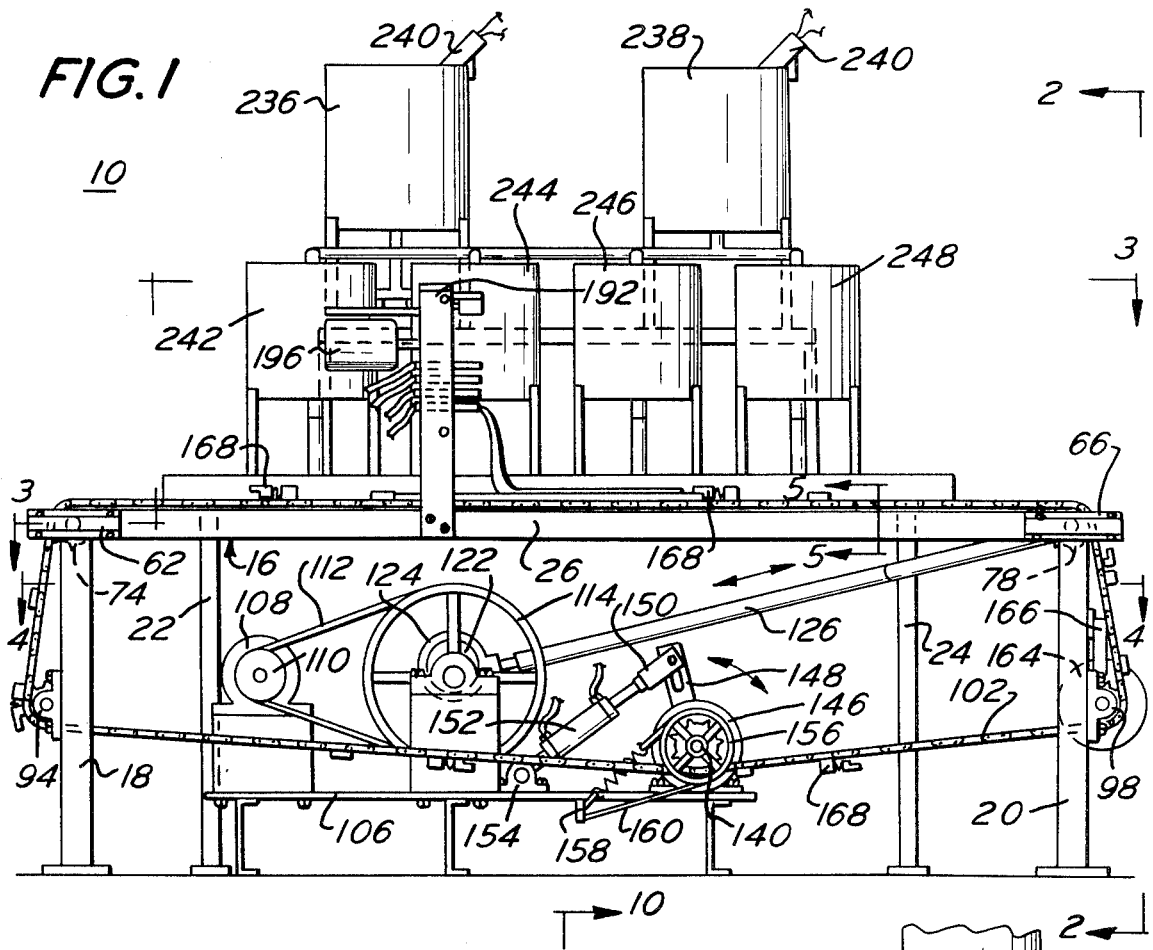
FIG. 1 is a side view of apparatus for manufacturing plastic sheeting having a pearlescent effect in accordance with the present invention.
Figure 2:
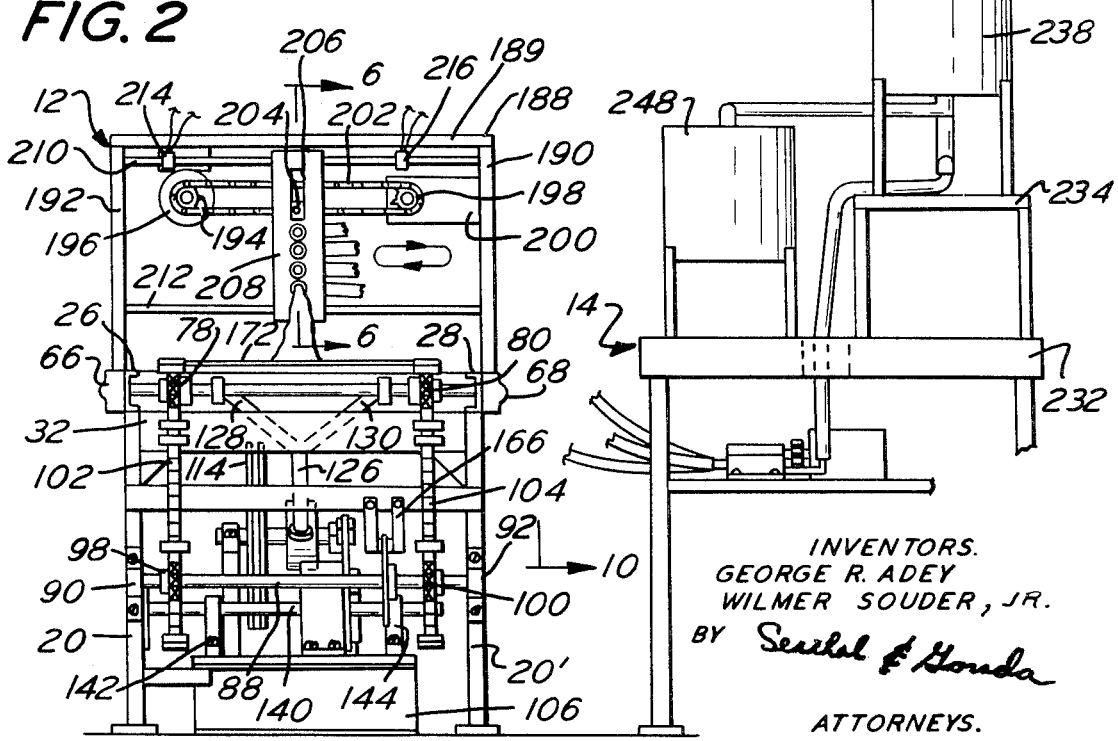
FIG. 2 is an end view of the apparatus shown in FIG. 1 taken along the line 2—2.

Referring now to the drawings in detail, there is shown in FIG. 1 an apparatus for continuously making plastic sheets of resin having a pearlescent effect, designated generally as 10. As best shown in FIG. 2, the apparatus 10 includes two basic components, namely a receiving and orienting section designated generally as 12 and a catalyzing and feeding section designated generally as 14. The sections 12 and 14 are described separately, and then they are combined in connection with the description of their operation.

Referring now to FIGS. 1, 2, 3 and 4, the receiving and orienting section 12 comprises a stand 16 which includes two pairs of end legs 18; 18' and 20; 20' which together with intermediate legs 22 and 24 support side rails 26 and 28 which extend between the legs 18 and 20, and between the legs 18' and 20', respectively. End rails 30 and 32 extend between the side rails 26 and 28 and are joined to them. In the preferred embodiment, the foregoing described members of stand 16 are manufactured from channel steel and welded at the joints. While the stand 16 may be made with other materials and from members which are shaped differently, it is important that the stand be constructed so as to provide a rigid supporting structure.

The stand 16 supports a rigid frame 34 that is preferably made from welded tubular members. As shown, the frame 34 includes a pair of spaced apart side members 36 and 38 which are joined together by a pair of reinforcing cross members 40 and 42. Cross members 40 and 42 are preferably joined to side members 36 and 38 by weldments. Bearings 44, 46, 48 and 50 are fixed to the ends of side members 36 and 38 by means of a threaded rod and nut assembly designated generally as 52. A bearing arm 54 extends through the bearings 44 and 46 and through slotted openings 58 and 60 into bearing housings 62 and 64. Similarly, a bearing arm 56 extends through bearing 48 and 50 and through slotted openings into bearing housings 66 and 68. As thus described, the frame 34 is horizontally mounted on stand 16 for reciprocable movement in a horizontal plane. The apparatus for reciprocating the frame 34 is described hereinafter.

Support rails 70 and 72 extend along and are fixed to the side members 36 and 38 of frame 34. As best shown in FIG. 5, the support rails 70 and 72 consist of angle members open to the outer side of the side members 36 and 28 with their laterally projecting flanges extending outwardly. As described more clearly below, the support rails 70 and 72 provide a base upon which an endless chain conveyor moves.

Sprockets 74 and 76 are mounted on the bearing arm 54 adjacent the bushings 44 and 46. In a like manner, sprockets 78 and 80 are mounted on the bearing arm 56 adjacent the bushings 48 and 50. A shaft 82 is journaled in bearings 84 and 86 intermediate the top and bottom of legs 18 and 18'. The second shaft 88 is journaled in bearings 90 and 92 intermediate the top and bottom of legs 20 and 20'. Sprockets 94 and 96 are fixed on the shaft 82 at a position immediately below the sprockets 74 and 76. Sprockets 98 and 100 are fixed on shaft 88 immediately below the sprockets 78 and 80. The above described sprockets support endless chain belts 102 and 104 for a continuous movement along the support rails 70 and 72 in the manner of a conveyor. As shown, endless chain belt 102 extends along support rail 70, engages sprocket 78, descends downwardly and engages sprocket 98, is engaged by a sprocket 136 on the drive mechanism, engages sprocket 94, and then extends upwardly into engagement with sprocket 74. Similarly, endless chain belt 104 engages sprocket 80, descends downwardly and engages sprocket 100, extends the length of the apparatus 10 below the frame 34 and is in engagement with a drive sprocket 104, engages the sprocket 96 and extends upwardly into engagement with sprocket 76. As thus mounted, the endless chain belts 102 and 104 can be driven continuously over the support rails 70 and 72.

A second stand 106 is positioned beneath the stand 16 and provides a platform for the endless chain belt drive and for the frame 34 reciprocating apparatus. The reciprocating apparatus comprises an electric motor 108 mounted on stand 106. Motor 108 drives a pulley 110 about which extends a belt 112. The belt 112 extends about a second pulley 114 which is fixed on shaft 116. Shaft 116 is journaled in bearings 118 and 120 which are mounted above the stand 106. As shown in FIG. 8, an eccentric bearing 122 is fixed to shaft 116 and therefore rotates with it. Bearing 122 is fixer to rod 126 which is connected to rod arms 128 and 130 which in turn are connected to bearing arm 56 on frame 34 by means of the bushings 132 and 134.

As thus assembled, the reciprocating motion developed in rod 126 by the bearing 122 will be transmitted to the frame 34 which will reciprocate within the bearing housings 62, 64, 66 and 68. The diameter of pulley 114 is adjusted in relation to the speed of motor 108 and the diameter of pulley 110 to provide the required rate of reciprocation.

The drive apparatus for endless chain belts 102 and 104 is mounted on stand 106 and includes sprockets 136 and 138 which are fixed to shaft 140. Shaft 140 is journaled in bearings 142 and 144 which are mounted on stand 106. A one way clutch 146 is also mounted on shaft 140. A connecting arm 148 extends from clutch 146 and is rotatably connected to piston rod 150. Piston rod 150 is, in turn, connected to a piston within hydraulic cylinder 152. Cylinder 152 is rotatably journaled in bearing 154.

Clutch 146 is a conventional one way type of clutch mounted so that counterclockwise rotation of connecting arm 148 by application of hydraulic pressure to piston rod 150 through cylinder 152 will cause shaft 140 to rotate counterclockwise as viewed in FIG. 1. When connecting arm 148 and piston rod 150 return to their normal position as shown in FIG. 1, clutch 146 releases from shaft 140 and thus does not rotate it. The clockwise rotation of shaft 140 is transmitted to sprockets 136 and 138 which in turn drive endless chain belts 102 and 104 in a clockwise direction as viewed in FIG. 1.

The primary braking system for holding the endless chain belts 102 and 104 in position except during the forward stroke of piston rod 150 comprises a disc 164 fixed on shaft 88 between a pneumatically operated clamp 166. The clamp 166 is connected to a source of gas pressure (not shown) and to an electrical control mechanism (not shown) which causes it to engage the disc 164 while the piston rod 152 is in its normal position and to release the disc 164 during the forward and return stroke of the piston rod 150.

To assist in preventing endless chain belts 102 and 104 from slipping in either a clockwise or counterclockwise direction during the brief period when cylinder 152 is returning rod 150 and connecting arm 148 to the starting position, an auxiliary brake mechanism has been provided. The auxiliary brake mechanism consists of a pulley 156 fixed on the end of shaft 140. A bracket 158 is fixed to and extends from stand 106. A belt 160 is wound about pulley 156 and has one end fixed to bracket 158. The other end of belt 160 is fixed to a spring 162 which in turn is fixed to bracket 158. Belt 160 is preferably cylindrical and in moderate frictional engagement with pulley 156. The amount of frictional engagement can be adjusted by expanding or contracting spring 162. The frictional force between pulley 156 and belt 160 is sufficient to prevent the endless chain belts 102 and 104 from moving during the period when connecting arm 148 and piston rod 150 are returning to their starting position. However, the frictional force is sufficiently small so that the force of cylinder 152 on its forward stroke will overcome it and cause the belt 160 to slip on pulley 156.

Pneumatic pressure for cylinder 152 is supplied from a source of gas pressure (not shown) and is controlled in its application to the cylinder by apparatus to be described hereinafter.

The apparatus is provided with means by which trays 172 can be positioned at the entrance end and removed at the exit end of the moving endless chain belts. As best shown in FIGS. 1 and 3, a plurality of spring biased retaining clamps 168 are mounted at spaced intervals on the endless chain belts 102 and 104. In addition, a plurality of fixed blocks 170 are positioned on endless chain belts 102 and 104 at spaced intervals from the clamps 168. The clamps 168 and blocks 170 cooperate to retain a liquid supporting surface in the form of a tray on the endless chain belts 102 and 104 as they traverse the distance across the top of stand 16. Referring to FIG. 9, there is shown an enlarged view of a clamp 168 on endless conveyor chain 102. The clamp 168 includes a base 174 which is welded or otherwise fixed to the endless chain belt 102. A back member 176 is fixed to the base 174 and provided with a recess 178 for the spring 180. A gripping member 182 is slidably mounted on base 174 by means of a tenon and groove. A recess 184 is provided in gripping member 182 for receiving spring 180 which tends to bias it forward against a block fixed to base 174. Gripping member 182 is also provided with a flange 186 that projects outwardly and over the tray 172. The biasing force from spring 180 on clamp 186 forces the tray 172 against a cooperating block 170 spaced from the clamp 168 by a distance slightly less than the length of the tray. The clamping force between gripping member 182 and the block 170, together with the retaining function of flange 186, is sufficient to hold the trays 172 in position during the combined reciprocating and intermittent displacement of the endless chain belts 102 and 104. The sets of clamps 168 and blocks 170 can be positioned on the endless chain belts 102 and 104 so that there is only a small open space between trays 172 as they move along the stand 16.

The trays 172 provide a means for receiving liquid plastic resins in a manner to be described hereinafter. Preferably the trays are provided with small side rails for preventing the resin from spilling over during the initial application. However, if the trays are wide enough such rails may not be necessary. More importantly, the trays provide a surface upon which the liquid may be received and a means by which the reciprocating motion of frame 34 can be transferred to the liquid resin to impart orientation in one plane to the pearlescence. The surface of the tray can be smooth to give orientation in a single plane, or patterned to give the orientation a rippling or wavy effect.

The means for distributing liquid resin on the trays 172 include a frame 188 comprising a cross bar 189 supported over the stand 116 by a pair of uprights 190 and 192. A sprocket 194 is fixed to the shaft of motor 196 which is mounted on the cross arm 189. A second sprocket 198 is rotatably mounted on bracket 200. An endless chain 202 extends around the sprockets 194 and 198 and has fixed thereon a sliding block 204. Block 204 is slidably mounted in a slot 206 in nozzle support plate 208. Support plate 208 is slidably mounted on guide rods 210 and 212.

As thus constructed, energization of electric motor 196 drives endless chain 202 about the sprcokets 194 and 198. Block 204 will move with the chain about the sprockets, and at the same time it will move up and down in slot 206. In this manner, the plate 208 is caused to reciprocate transversely across the stand 16. The distance between sprockets 194 and 198 fixes the length of traverse of plate 208. If desired this distance can be adjusted by providing adjustable mounts for electric motor 196 and sprocket 198.

Microswitches 214 and 216 are adjustably mounted on guide rod 210 at positions adjacent the sprockets 194 and 198. Microswitches 214 and 216 are positioned so that the plate 208 will engage and close them at the end of each traversal of the receiving and orientating section 12. Microswitches 214 and 216 are connected to an electrical control circuit which is operative to open and close solenoid valves in the hydraulic lines between cylinder 152 and the aforesaid reservoir of hydraulic fluid and between the hydraulic clamp 166 and said reservoir. The effect of the control circuit is to energize cylinder 152 and thereby drive the endless chains 102 and 104 forward a predetermined distance. At the same time, the hydraulic clamp 166 on disc 164 is released. The control circuit includes timing means for holding the clamp 166 in open position until cylinder 152 has driven piston rod 150 completely forward. The control circuit is conventional and therefore need not be described in detail.

Plate 208 supports one to four nozzles such as nozzles 218, 220, 222 and 224 in vertical alignment above the tray 172. The nozzles 218–224 extend equal distances outwardly from plate 208. As thus mounted and positioned, each nozzle 218–224 will discharge liquid resin at the same area on the surface of trays 172.

Referring to FIG. 7, an enlarged view of nozzle 218 is shown. As this nozzle is identical with nozzles 220, 222 and 224, it will be described as being representative thereof. A pair of hoses 226 and 228 are connected to the inlet side of the nozzle 218. As will be explained hereinafter, the hoses 26 and 228 conduct resin from different sources to the nozzle. Each nozzle is provided with a means to intimately mix the fluids flowing from hoses 226 and 228. By way of example there is positioned within each nozzle a mixer 230 in the form of a flat helical member extending throughout the length of the nozzle. The mixer 230 causes intimate mixing of the liquid resins fed by hoses 226 and 228. If desired, a Bink mixer could be substituted.

Referring now to FIGS. 2, 10 and 11, there is shown in detail, the catalyzing and feeding apparatus 14. Apparatus 14 includes a stand 232 upon which is supported an intermediate stand 234. Mounted on the intermediate stand 234 are containers 236 and 238. Each of the containers 236 and 238 is provided with a bracket upon which is mounted an electric mixer 240 for stirring the liquid resins within the containers. Mounted directly on the stand 232 and below the containers 236 and 238 are four additional containers 242, 244, 246 and 248. A liquid conduit 250 is connected to an opening in the bottom of container 238 and is provided with outlets which open directly into containers 242, 244, 246 and 248. A valve 252 may be provided between container 238 and conduit 250 to control the rate of flow through it.

A platform 254 is mounted on the stand 232 below the containers 242–248. Four pump motors 256, 258, 260 and 262 are supported on platform 254. The output shaft of each pump motor 256–262 is provided with sprockets 264, 266, 268 and 270, each of which engage and drive two gear pumps 272, 274; 276, 278; 280, 282; and 284, 286, also mounted on platform 254. It should be understood that other types of pumping means could be used. However, the advantage of gear pumps is that the rate of pumping can be adjusted simply by changing the speed of the drive shafts of motors 256–262. As will be explained hereinafter, it is expected that in the operation of the apparatus, each motor-pump set, consisting of the drive motor and two pumps, will be operated at different pumping rates.

As illustrated in FIG. 10, the container 236 opens into a conduit 288 which in turn branches out into four additional conduits illustrated schematically in FIG. 10 as 290, 292, 294 and 296. Each of the conduit branches 290–296 is connected to a gear pump as best illustrated in FIG. 11. A valve 298 is mounted in conduit 288 for providing additional flow control.

Conduits 300, 302, 304 and 306 provide communication between the containers 242–248 and individual gear pumps 274, 278, 282 and 286, respectively. If desired, valve means (not shown) can be mounted in conduits 300–306 to provide additional flow control for liquids.

As thus assembled, each of the motor-pump sets is delivering two sources of liquid, one of which is fed directly from container 236 and the second of which is fed from container 238 through containers 242–248. Each pair of outlet conduits, such as conduits 226 and 228, is connected directly from the gear pumps to one of the nozzles 218–224. Thus, conduits 308 and 310 are connected to nozzle 220, conduits 312 and 314 are connected to nozzle 222 and conduits 316 and 318 are connected to nozzle 224.

Having described in detail the apparatus shown in FIGS. 1–11, its operation will be described in connection with the manufacture of plastic sheets having a pearlescent effect. The operation described hereinafter, will be preferably directed to the use of a thermosetting resin. However, it will be readily apparent to one skilled in the art that the process described is equally suited to be used with materials other than thermosetting resins. For example, a wide variety of resins which can be characterized as thermoplastic may also be employed. Modifications to the structure described may be required when using materials other than thermosetting resins. Such modifications, however, are well within the skill of workers in the art. Extensive experimentation will not be required for adaptation to the classes of materials disclosed herein.

Polyester resins are the preferred thermosetting resins for use in the apparatus of this invention. The most suitable polyester resin can be selected from the products of unsaturated dibasic acids with unsaturated glycols. Unsaturated dibasic anhydrides may also be used, such as maleic anhydride. The preferred unsaturated glycols suitable for use in the practice of the present invention would include propylene glycol, diethylene glycol and the like. It is further preferred that the polyester resins used in the process and operation of the apparatus of this invention be modified with the addition of predetermined quantities of certain monomers. Very desirable properties are obtained from polyester resins containing modifying monomers such as styrene, acrylic monomers such as methyl methacrylate, allyl monomers such as diallyl phthalate, vinyl monomers, and mixtures and copolymers thereof. It is further well known in the art of preparing unsaturated polyester polymers that mixtures of unsaturated dibasic acids or anhydrides and mixtures of alcohols will modify the properties of the resultant polymer in a known manner. Conventional commercial preparations of these materials are well adapted for use in the process and apparatus of the present invention.

Other thermosetting resins suitable for use herein would include polyethers such as epoxy resins.

Thermoplastic materials may also be used in the method and apparatus of the present invention. Specific polymers which would be suitable for such use would include polymers or copolymers of materials containing an ethylenic linkage. Examples of monomers suitable for preparation of polymeric materials useful in this invention are acrylic monomers and styrene and substituted styrene monomers.

It is also possible to use resin-containing solvent systems and plastisols and plastigels containing suitable clear-curing resins, to prepare oriented pearlescent sheeting as disclosed herein. Such materials would require providing the apparatus disclosed herein with a means for controlling the rate of solvent evaporation during the formation of the sheeting. Proper control of the evaporation would permit the resin to set to a non-flowable state after the pearlescence has been oriented according to this invention. The specific apparatus for accomplishing the desired control over the rate of evaporation has not been illustrated. Such devices are well known in the art of casting sheets or films of resins or polymers from solvent systems, and could employ means for applying heat such as by hot air or the like or evaporation under reduced pressure by passing the sheet through a solvent-stripping low pressure environment.

In a similar manner modifications to the apparatus disclosed which may be necessitated by the use of thermoplastic material are well within the skill of a worker in this art. For example, the thermoplastic resins may be employed to form self-supporting sheeting by applying the thermoplastic material to the trays 172 in a fluid condition. In the case of some resins, this would necessitate using heaters, possibly on the storage tanks and the supply hoses. Likewise, an appropriate distance downstream from the application of such material, a cooling means could be provided to set the thermoplastic resin into a non-flowable state once the pearlescence has been oriented within the sheeting according to this invention.

Typically, during the operation of the apparatus described herein, the desired amount of a polyester thermosetting resin to be used in a predetermined time period of machine operation is formulated and divided in half. One half is placed in container 236 and the other half is placed in container 238. A catalyst is added into the container 236 and thoroughly mixed by the mixer 240. In a like manner, if desired, a wax can be added to form a protective air barrier so that the exposed surface of the resin will set without being affected by the air. The application of wax in this manner provides the thermosetting resin with a non-tacky surface. Such a condition will be referred to hereinafter as a surface which has dried to the touch.

A promoter is added to the resin in container 238 and thoroughly stirred by the mixer 240.

Pearlescence is added to the containers 242–248. Thus, the containers 242–248 may contain white pearlescence, or other coloring materials, including colored pearlescence having both reflected and transmitted colors:

To begin the operation, the receiving and orientating section 12 is placed into operation by energizing motors 108 and 196 as well as the electrical control for hydraulic cylinder 152 and hydraulic clamp 166. Thus, the frame 34 begins to reciprocate on stand 16 at a rate which in the preferred embodiment is approximately 250–500 cycles per second over a distance of approximately plus or minus ½ to 1 inch. At the same time, the nozzles 218–224 are traversed back and forth across the trays 172. The rate of traversal is adjusted to provide the preferred thickness. At the end of each traversal, the hydraulic cylinder 152 is actuated and biases the endless conveyor belts 102 and 104 forward approximately 1–2 inches. The rate of traversal and the amount of movement forward at the end of each traversal depends upon the type of resin being used and the rate at which it is expected to gel. Accordingly, the numbers set forth above should be regarded as exemplary and in no way limiting.

By opening valve 298, resin flows from containers 236 to the motor-pump sets. As explained hereinbefore, resin flows directly from container 236 to pumps 272, 276, 280 and 284. When valve 252 is opened, resin and promoter from container 238 flows into containers 242, 244, 246 and 248. Then it is mixed in these containers with the desired pearlescence and appropriate pigment. From containers 242–248 it flows to pumps 274, 278, 282 and 286. Once containers 242–248 have been filled with sufficient resin for a specified run the valve 252 is closed. Thereafter, the containers 242–248 are the sole source of resin mixed with pearlescence.

During all of the mixing and pumping operations care must be taken to avoid the formation of air bubbles.

The rate of feed from individual pumps to the nozzles 218–224 is determined by the speed of the individual motors 256–262. Thus, if the final product is to have more from one container than another, then pumps 276 and 278 could operate at a greater rate than pumps 280 and 282.

All pumps are started and the resin containing catalyst mixture and the resin containing promoter and pigment reach the nozzles 218–224, they are thoroughly intermixed by mixer 230 to thereby chemically actuate them, and then expelled directly onto the surface of trays 172. Since the nozzles are vertically aligned, each nozzle will drop its material onto the same area of the tray, depending upon the position of the nozzle plate 208.

It is ordinarily possible to use only one nozzle. But to increase flow rate two, three or four can be used. Also, the additional nozzles allow for the use of color or colored pearlescence, or for continuous use when a first nozzle becomes inoperative.

The overall effect of the intermittent displacement of the trays together with the traversing movement of the nozzles is to lay down an undulating stream of resin on the surface of the trays. The effect of the reciprocating motion imparted to the trays is twofold. The first, and most important, is that it orientates the pearlescence in parallel horizontal planes. The second effect is that it causes the undulating stream to merge so as to form a sheet of uniform thickness.

The side walls of the trays 172 prevent the plastic material from flowing off before it sets into a non-flowable mass.

The rate of movement of the trays away from the area of impingement of the plastic material depends upon the setting rate of the plastic. In general, the length of the conveyor or the rate at which it moves is to be adjusted so that the chemical reaction to set the plastic material has continued to a point where upon being removed from the trays when they reach the end of the stand 16, the sheet is ready to be removed for further operations such as blanking. Thus, between the area of impingement and a point along the trays 172 where the plastic has set to a non-flowable state, hereinafter referred to as the gel point of the resin, the apparatus 10 has converted the resin containing unoriented pearl essence into semi-solid oriented pearlescent sheeting. Moreover, this process is continuing at a constant rate because catalyzed resin is being continuously flowed onto the trays.

While the present invention has been described in one form, it should be understood that other forms are possible. For example, rather than dividing the desired amount of resin in half and adding catalyst to one half and promoter to the other half, the following alternative could be used. The promoter is added to the entire amount of resin and the catalyst is introduced undiluted through its own pumps or pumps just prior to the mixing nozzle or nozzles. Likewise where only a narrow sheet is desired the nozzles do not have to be traversed across the trays. Moreover, a conveyor belt can be substituted for the trays and the endless chain belts 102 and 104 can be driven at a constant rate.

Referring now to FIG. 12, a schematic illustration of another type of continuous apparatus is shown. The apparatus is designated generally as 320 and only those portions of the apparatus which differ from the apparatus 10 are illustrated. As shown, the apparatus 320 includes a lower conveyor belt 322 and an upper conveyor belt 324, each driven in the direction indicated by the semicircular arrows. In addition, both belts 322 and 324 are reciprocated by means such as described with relation to the apparatus 10. The belts 322 and 324 are reciprocated at the same rate and preferably from a common drive. Preferably, the belts 322 and 324 are dammed at the sides to prevent liquid resin from overflowing. As shown, belt 324 is shorter than belt 322 to provide a receiving area for resin from nozzles 326 and 328 supported thereabove. Conveyor 324 is positioned relatively close to conveyor 322 so that it contacts resin deposited on conveyor 322. The advantage of such an apparatus is that it promotes orientation of the pearlescence from both the top and bottom surface of the finished plastic sheeting.

The conveyor belts, such as belt 322, are preferably made of metal, and can be continuous strips, or continuous strips which are sectioned off.

Referring now to FIG. 13, there is shown a perspective view of another embodiment of the present invention. In this embodiment means are shown whereby the basic structure of the receiving and orientating section 12 can be modified by adding to it a continuous belt for producing continuous sheets of plastic.

To simplify the description, the supporting frame structure for the receiving and orientating section has been omitted from FIG. 13. All structure herein shown has been assigned the same number that it had in the other figures of the drawings. Thus, like numerals indicate like elements as described with respect to FIGS. 1–11.

A continuous belt apparatus which is adapted to be fitted onto the reciprocable frame 34 is designated generally as 400. Belt apparatus 400 comprises a pair of elongated channel members 402 and 404 which are substantially longer than the distance between the bearing arms 54 and 56. Thus, the overall length of the continuous belt apparatus 400 is greater than that of the receiving and orientating section 12.

The channel members 402 and 404 are held in opposed parallel relationship by a plurality of reinforced cross members 406 which extend between them and join them together. Mounted adjacent either end of the channel members 402 and 404 are drums 408 and 410. Drums 408 and 410 are mounted on axles 412 and 414 which extend through bearings 416 and 418 mounted to the bottom members 402 and 404.

Bearings 416 and 418 are preferably mounted so as to be adjustable in the longitudinal direction. Thus, threaded members such as members 420, 422 and 424 extend through internally threaded blocks, such as blocks 426 and 428, and are rotatably connected to bearings 416 and 418. The bearings 416 and 418 are slidably mounted on channel members 402 and 404 so as to be adjustable in the longitudinal direction. By rotating the threaded members 420–424, the bearings 416 and 418 can be moved toward and away from each other thereby providing a means to adjust the tension in the belt 430 which extends around the drums 408 and 410.

Belt 430 is preferably made of a flexible metal, such as stainless steel. The belt extends around the drums 408 and 410 and over the rollers 432 and 434 which bias the lower portion of the belt upwardly to avoid interference with the frame 34 and the operating apparatus of the receiving and orientating section 12.

The length of the channel members 402 and 404 is sufficient to allow the drums 408 and 410 to be spaced apart far enough so that they are beyond the bearing arms 54 and 56 and thus do not interfere with them.

The belt 430 is normally held under sufficient tension by the adjustment means described above so that no support means is required. However, panels 436 and 438 could be provided if desired.

Thus described, the belt apparatus 400 is adapted to be carried by some form of lifting apparatus, such as a fork lift, and positioned on the frame 34. To retain the belt apparatus 400, a plurality of clamps, such as clamps 440 and 442 have been provided. These clamps fit over the side members 36 and engage the same to retain the belt apparatus 400 in place thereon.

The means for reciprocating the frame 34 is the same as that described above. However, it is no longer necessary to operate the apparatus for indexing the chain belts 102 and 104, since a separate drive is provided for the belt 430.

As shown, the drive for belt 430 includes a sprocket 444 mounted on the end of shaft 414. A drive belt 446 extends around the sprocket 444 and engages a sprocket 448 on shaft 450. Shaft 450 is mechanically connected to a gear box 452 which in turn is mechanically connected to a motor 454. Gear box 452 provides a means for adjusting the speed of the belt 430. Those skilled in the art will readily recognize that other gearing and/or velocity adjusting means may be provided.

Once the belt 430 has been placed in position, the frame 188 may be replaced and the apparatus operated substantially as described above.

Of course, the indexing means will no longer be used. This means that the liquid plastic will be laid down at an angle other than 90° with respect to the longitudinal axis of the belt due to the simultaneous movement of the belt and the traversing movement of the nozzles. By adjusting the rate of traverse and rate of movement of the belt, this angle can be made to be minimal. In any case, its major effect would only be noticeable at the end of sheeting being produced which would normally be cut off in any case.

Likewise, it is possible to employ stationary nozzles or even a plurality of horizontally disposed nozzles in the practice of the present invention. Adjustments in variable factors such as viscosity of resin and the like, to accommodate alternative nozzle positioning can easily be made without undue experimentation.

It can therefore be seen from the foregoing that the practice of the present invention contemplates providing sheeting containing oriented pearlescent material, which can be produced from resinous or polymeric materials which set by evaporation of solvents alone or which set by an oxidative or polymerization process.

The plastic materials preferred in the invention disclosed herein, include a wide variety of unsaturated polyester resins. With such materials it is necessary to use a promotor and/or accelerator, and catalyst in the formulated resin mix to achieve the desired gelling or setting of the sheeting. Preferably such materials may be selected from organic oxygen releasing compounds such as benzoyl peroxide, cumene hydroperoxide, cyclohexanone and methyl ethyl ketone peroxide. Likewise, the use of a promoter is preferred. Generally useful promotors are selected from metal soaps whose metal is oxidizable and capable of changing valence upward. Metal soaps such as cobalt naphthenate, cobalt octoate, magnesium octoate, and zirconium tallate function well as promotors. Selection of a promoter and the catalyst in the amounts useful in this invention is a matter of choice to the artisan. No undue experimentation is necessary to determine the optimum amounts of selected materials for achieving a gel or setting point in the sheeting as described hereinbefore.

The term pearlescence as used herein is intended to encompass all of the class of light-reflecting and light transmitting lamellae which have been widely used for the purpose of imparting integral white or colored sheen to transparent or substantially transparent materials. Such lamellae include the pearlescence obtained from fish scales, various inorganic substitutes therefor, and metal bronze powders. The foregoing and other equivalent light-reflecting and light transmitting materials may be used in the practice of the present invention.

The following examples are typical of formulations used as described herein to prepare plastic sheeting containing oriented pearlescence.

EXAMPLE 1

A stock formulation is prepared from the following materials:

|  | Parts |
|---|---|
| PE–205 an unsaturated polyester resin formulation sold by Plaskon Division of Allied Chemical & Dye Corp. | 90–100 |
| A mixture of Nacromer XPE and Murano MYGT pearlescent pigments from Mearl Corp. of New York | 1.5 |
| Styrene | 0–10 |
| Cobalt naphthenate (a 6% solution) | .75 |
| Lupersol Delta-X, methyl ethyl ketone peroxide | 1.0 |
| A 5% by weight solution of Esso wax 4030 (a white paraffin wax) in styrene monomer | 1.5 |

Styrene monomer is added to the PE–205 polyester resin until the mixture attained a viscosity of about 1200 cps. at 77° F. Wax is added and the thinned resin is then divided into two equal quantities. The pearlescence and cobalt soap are added to one of the divided portions and the organic peroxide catalyst is added to the other portion. The contents of the two containers are then mixed as described hereinbefore using equal flow rates from each container. As the mixed resin is expelled directly onto the surface of trays 172, the rate of travel of the supporting belt or tray is adjusted to conform with the rate of exhaust of the mixed resin so that the location of a predetermined setting or gel point can be controllably established downstream. Adjustment can also be made in the temperature environment for the cast sheeting, a higher temperature accelerating the gelling or setting, thereby permitting faster travel of the web or tray, and a lower temperature retarding the gelling or setting. The above formulation may, of course, contain greater or lesser amounts of cobalt naphthenate and organic peroxide within wide limits depending upon the speed or distance of travel desired for the formation of a non-flowable sheet. Further, the amount of styrene monomer added can be adjusted to produce a material having a viscosity in the range of from about 400 to about 2500 cps. at 77° F. and still obtain the desired results.

EXAMPLE 2

A typical formulation of a thermoplastic resin suitable for use in preparing oriented pearlescent containing plastic sheeting can be mixed using the following representative amounts.

|  | Parts |
|---|---|
| Methyl methacrylate syrup | 100 |
| Thiophenol | .2 |
| Dimethylaniline | .8 |
| Nacromer ZPG–B, a nacreous or pearlescent pigment | 1.5 |

Such a formulation is used in the manner described in Example 1 by adjusting the viscosity of the methyl methacrylate syrup to a value of approximately 1000 cps. at 77° F. by the addition of methyl methacrylate monomer. The resulting liquid is then split into equal portions, as in Example 1. Dimethylaniline and Nacromer ZPG–B pearlescence are added to one portion and the thiophenol to the other. The discharging resin will gel in approximately 10 to 20 minutes, which time can be adjusted by changing the temperature or the concentration of the thiophenol and dimethylaniline.

EXAMPLE 3

The following epoxy resin formulation is prepared:

|  | Parts |
|---|---|
| Epon 828, a bisphenol A-epichlorohydrin resin formulation sold by The Shell Chemical Co. | 80 |
| Triethylene tetramine (hardener) | 20 |
| Nacromer YGP, a pearlescent material manufactured by The Mearl Corporation | 1.5 |

The ratio of hardener in the above formulation may be altered to control gel time. Likewise changes in temperature will affect gel time, i.e., an increase in temperature providing for a speedier gel.

The pearlescence is premixed with the entire quantity of Epon 828. The entire portion of triethylene tetramine is kept in a separate container. Each portion is pumped to the mixing nozzle. The pump speeds are set to maintain the predetermined formula ratio. The mixed resin from the mixing nozzle is then applied in the manner described in the preceding examples.

The viscosity of the epoxy resin system can be controlled by diluents which can be reactive or non-reactive. For example, the non-reactive diluents which can be used are xylene phthalate and dibutyl phthalate. Reactive diluents both monofunctional and difunctional may be used. For example, allyl, butyl, cresyl and phenol glycidyl ether, as well as diglycidyl ether, vinyl cyclohexene and bis (2,3-epoxy cyclopentyl)ether.

The hardener selected for use in the preceding formulation may be selected from among a large number of aliphatic amines which are capable of reacting with Bisphenol A-epichlorohydrim resins. For example, diethylene triamine, triethylene tetramine, diethylamino propylamine and amine terminated polyamides may generally be employed in stoichiometric quantities to produce the desired hardening function.

The present invention may be embodied in other specific forms without departing from the spirit or essential attributes thereof and, accordingly, reference should be made to the appended claim rather than to the foregoing specification as indicating the scope of this invention.

We claim:

1. A method of continuously manufacturing oriented light reflecting lamellae-containing plastic sheeting comprising the steps of providing a first source of settable fluid clear resin, providing a second source of light reflecting lamellae-pigmented resin, continuously off-taking resin from said first and second sources in predetermined portions, continuously and mechanically intimately mixing said portions of resins just prior to applying the mixture of settable light reflecting lamellae-containing fluid resin to an area of a surface, and then applying the mixture of settable light reflecting lamellae-containing fluid resin to an area of a surface, said fluid resin being selected from the group consisting of thermoplastic resins, thermosetting resins and resin in solvent systems, continuously providing a fresh surface for the application of the mixture by moving the surface area bearing the mixture away from the point of application of said mixture, simultaneously imparting periodic motion to said moving surface solely along an axis in the plane of said surface to orient the light reflecting lamellae until said fluid resin is rendered non-flowing while the upper surface of said fluid resin is exposed to the atmosphere, and then removing the oriented plastic resin from said surface.

References Cited

UNITED STATES PATENTS

| | | | |
|---|---|---|---|
| 2,615,271 | 10/1952 | Ulmer | 264—70 X |
| 2,921,346 | 1/1960 | Fischer | 264—108 |
| 2,971,223 | 2/1961 | Grunin | 264—108 X |
| 3,232,819 | 2/1966 | Satas | 264—216 X |
| 3,303,245 | 2/1967 | Trudeau | 264—70 |

ROBERT F. WHITE, Primary Examiner

A. M. SOKAL, Assistant Examiner

U.S. Cl. X.R.

264—73, 108